United States Patent [19]

Seng

[11] Patent Number: 4,615,718
[45] Date of Patent: Oct. 7, 1986

[54] HEATING OF HEAT TRANSFER MEDIA

[75] Inventor: Stephen Seng, Bladensburg, Ohio

[73] Assignee: Owens-Corning Fiberglas Corporation, Toledo, Ohio

[21] Appl. No.: 751,901

[22] Filed: Jul. 5, 1985

[51] Int. Cl.[4] .................. C03B 1/00; F28D 15/00
[52] U.S. Cl. .................................. 65/27; 65/335; 165/104.15; 165/104.18
[58] Field of Search ............ 65/27, 335; 165/104.15, 165/104.18

[56] References Cited

U.S. PATENT DOCUMENTS

| 4,316,732 | 2/1982 | Propster et al. | 65/27 |
| 4,319,903 | 3/1982 | Hohman et al. | 65/27 |
| 4,330,316 | 5/1982 | Hohman et al. | 65/335 X |
| 4,338,113 | 7/1982 | Hohman et al. | 65/27 |
| 4,386,951 | 6/1983 | Hohman et al. | 65/27 |
| 4,422,847 | 12/1983 | Propster et al. | 165/111 X |

Primary Examiner—Arthur Kellogg
Attorney, Agent, or Firm—Ronald C. Hudgens; Greg Dziegielewski; Ted C. Gillespie

[57] ABSTRACT

Heat transfer media is heated by passing the media downwardly through a chamber, introducing hot gases near the top of the chamber, introducing hot gases near the bottom of the chamber, and exhausting hot gases from a hot gas outlet positioned near the middle of the chamber.

12 Claims, 3 Drawing Figures

HEATING OF HEAT TRANSFER MEDIA

TECHNICAL FIELD

This invention relates to a process for heating heat transfer media with hot gases, such as gases from a glass-melting furnace. In particular, this invention relates to the heating of heat transfer media, which can then be used to heat glass batch for introduction into a glass-melting furnace.

BACKGROUND OF THE INVENTION

One method for preheating glass batch involves feeding cold particulate glass batch raw materials into one end of a rotating heat transfer drum, and feeding hot media of larger particle size than the batch particles into the other end of the heat transfer drum. The glass batch moves in direct and immediate physical contact with the heated media, with the batch flowing from the cold end to the hot end of the drum and the media flowing from the hot end to the cold end of the drum. The heated particulate batch is removed from the hot end of the drum and the cooled media is removed from the cold end of the drum. Preferably, the heat transfer media is of a durable material and can be comprised of glass batch agglomerates, glass, ceramic material, steel, stainless steel, aluminum, or gravel. The media can be spherical in shape, and a usable example of such media is spherical ceramic balls, having a diameter of approximately 1 inch.

The media are heated by direct contact with hot gases from any suitable source, such as exhaust gases from a glass melting furnace, or hot gases heated in a heat exchanger by the exhaust gases from a glass-melting furnace. Typically, the media are heated in a hopper in which the media flows downwardly from a top media inlet to a bottom media outlet. The hot furnace exhaust gases typically are introduced into the hopper near the bottom of the hopper and flow upwardly to a hot gas outlet near the top of the hopper. In this manner, the gases are cooled, and the media is heated for use in the batch heat transfer process.

One of the problems of such preheating apparatus is that the cold balls entering the media heater are coated with batch dust, and the flow of hot furnace exhaust gases through the media in the hopper entrains some of the dust. For pollution control purposes this dust must be removed from the exhaust gases exhausted from the hopper through the hot gas outlet. It would be desirable to have the dust remain on the media for return to the batch heat exchanger with the heated media.

Another problem with such media heaters is that the cold media supply conduit cannot be efficiently sealed into an airtight condition. The typical designs of media heaters position the cold media inlet adjacent the hot gas exhaust outlet, thereby creating a significant negative pressure in the vicinity of the cold media inlet. The result is that a substantial portion of the gases exhausted through the hot gas outlet come directly from the relatively cold air flowing through the media inlet. This necessitates oversized exhaust fan and pollution control equipment to deal with the larger volume of gases withdrawn from the media heater.

Attempts have been made to provide airtight seals on the media inlet and outlet conduits, but such seals have been ineffective due to wear and tear and jamming of the equipment by media dust and media chips. The problem of undesireable exhaustion of cold air from the media inlet can be partially solved by reducing the pressure differential between the hot gas inlet and the hot gas outlet. This can be done by oversizing the diameter of the media heater. Such a solution is somewhat undesirable, however, in that an increased media heater diameter necessitates the employment of a larger volume of media, which considerably increases the expense and capital required for the entire operation.

SUMMARY OF THE INVENTION

A solution to the above problems of media heaters is provided according to the present invention by supplying the hot gases to the top and bottom ends of the media heater, and exhausting the hot gases from the mid height of the media heater, thereby establishing the negative exhaust pressure at a position away from or separated from the cold media inlet and the hot media outlet.

According to this invention, there is provided apparatus for heating heat transfer media comprising a chamber having a media inlet at the first end and a media outlet at the second end, a first inlet for hot gases positioned near the first end of the chamber, and a second inlet for hot gases positioned near the second end of the chamber, a hot gas outlet positioned near the middle of the chamber, and means for establishing a negative pressure at the hot gas outlet to establish a flow of hot gases from both of the hot gas inlets to the hot gas outlet.

In a specific embodiment of the invention, the chamber is a vertical hopper with a top hot gas inlet and media inlet at the top end, and media outlet and bottom hot gas inlet at the bottom end.

In a specific embodiment of the invention, the chamber comprises an upper hopper and a lower hopper. Preferably, the hot gas outlet is positioned at the intersection of the upper hopper and the lower hopper.

In a preferred embodiment of the invention, means are provided for controlling the relative proportions of hot gases flowing through the top and bottom inlets, respectively.

According to this invention, there is also provided a method for heating heat transfer media comprising passing the media downwardly through a chamber, introducing hot gases near the top of the chamber, introducing hot gases near the bottom of the chamber, and exhausting hot gases from the hot gas outlet positioned near the middle of the chamber.

In a most preferred embodiment of the invention, the media are coated with fine particulate matter and the introduction of hot gases near the top of the chamber causes condensation on the media, thereby adhering the particulate material to the media.

DESCRIPTION OF THE INVENTION

This invention will be described in terms of a glass particulate batch preheating operation although it is to be understood that the term "glass" includes other heat softenable mineral material, such as rock, slag, and basalt. Also, this invention will be described in terms of using spherical media, although media of any shape or material can be employed with this invention. The heat transfer media, once heated according to this invention, can be used to heat any other material, such as air or other gases, dry cement or other particulate material, and liquids. Any heat exchange equipment capable of using heat transfer media can be employed.

The invention will also be described in terms of a vertical arrangement with a downward flow of media from top to bottom. It is to be understood that the apparatus could be turned on its side, with the flow of media from the end (a "first" end) toward the other end (the "second" end.)

Figure 1:
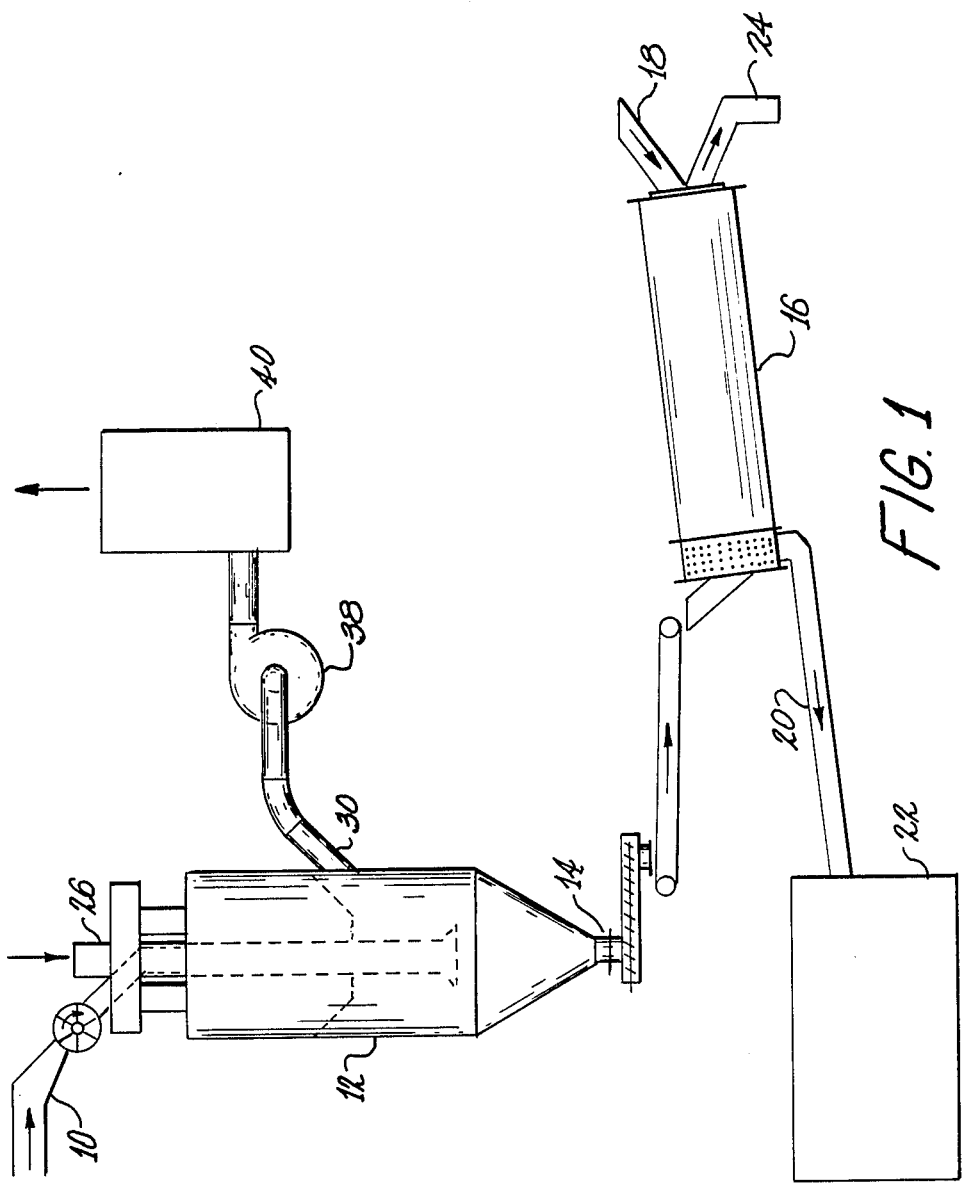
FIG. 1 is a schematic view in elevation of apparatus for heating media, which in turn heats glass batch in a rotating heat exchanger.

As shown in FIG. 1, heat transfer media is supplied through media inlet 10 into a chamber or media heater where the media is to be heated. The chamber can be any device suitable for heating the media, such as hopper 12. The media are discharged from the hopper through media outlet 14. From there, the media are deposited into a heat exchange apparatus to heat the batch, such as rotatable heat exchange drum 16. The heat exchange drum can be mounted for rotation about an axis which is preferably inclined at a small angle to the horizontal. Particulate glass batch material is supplied to the drum through cold batch inlet 18, passed through the heat exchange drum, where the batch is heated by the media, and removed from the heat exchanger through hot batch outlet 20 leading to glass melting furnace 22. The media are removed from the drum via conduit 24 and returned through the media inlet to the media hopper.

Figure 2:
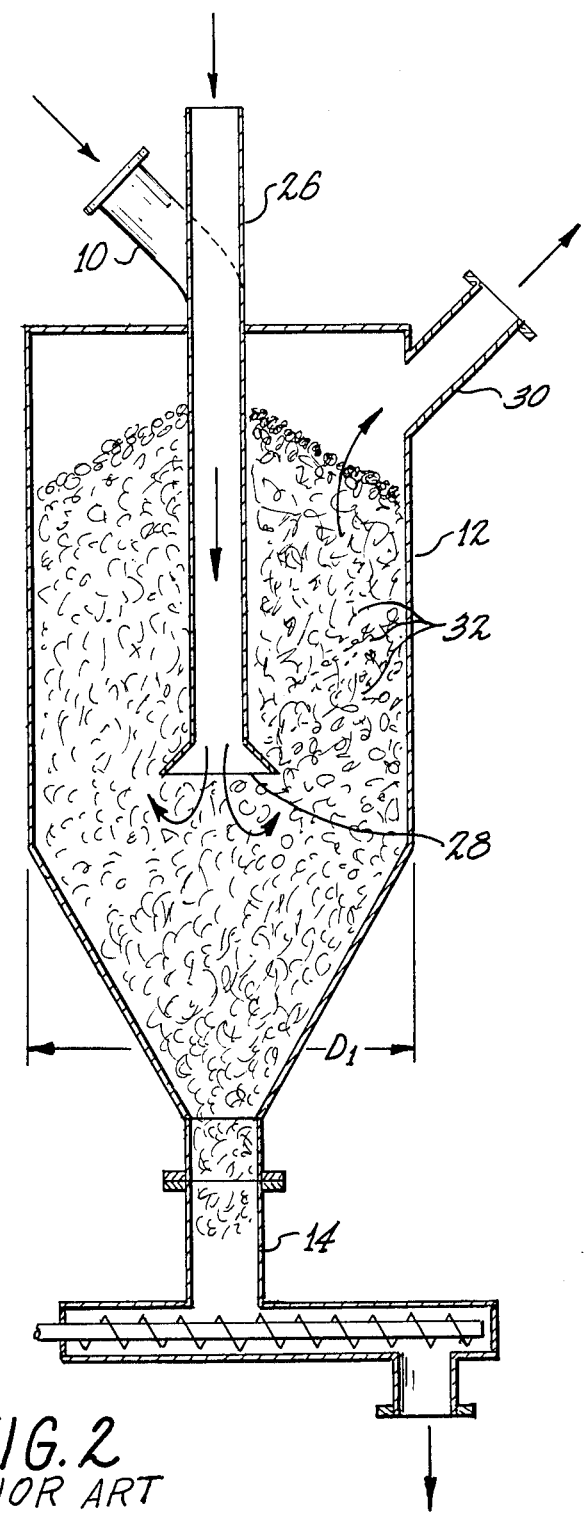
FIG. 2 is a schematic view in elevation of a media heater according to the prior art.

As shown in FIG. 2, the media hopper of the prior art is supplied with hot gases from hot gas inlet 26 which typically has discharge end 28 positioned near the bottom of the hopper. Positioned near the top end of the hopper is hot gas outlet 30 for removing the gases which have flowed around the media 32 within the hopper. In order to create the desired hot glass flow within the hopper, the hot gas outlet is connected to a fan, such as fan 38 shown in FIG. 1, to create a zone of negative pressure adjacent the hot gas outlet, i.e., at the top of the hopper. As can be seen, the zone of negative pressure is positioned adjacent the media inlet, and a considerable amount of cold air from the media inlet will be exhausted from the hot gas outlet. A typical negative pressure reading is 10–20 inches water column. In order to minimize the pressure differential and thereby the amount of negative pressure near the top of the hopper, the hopper must have a large diameter $D_1$ sufficient to enable a low pressure differential.

Figure 3:
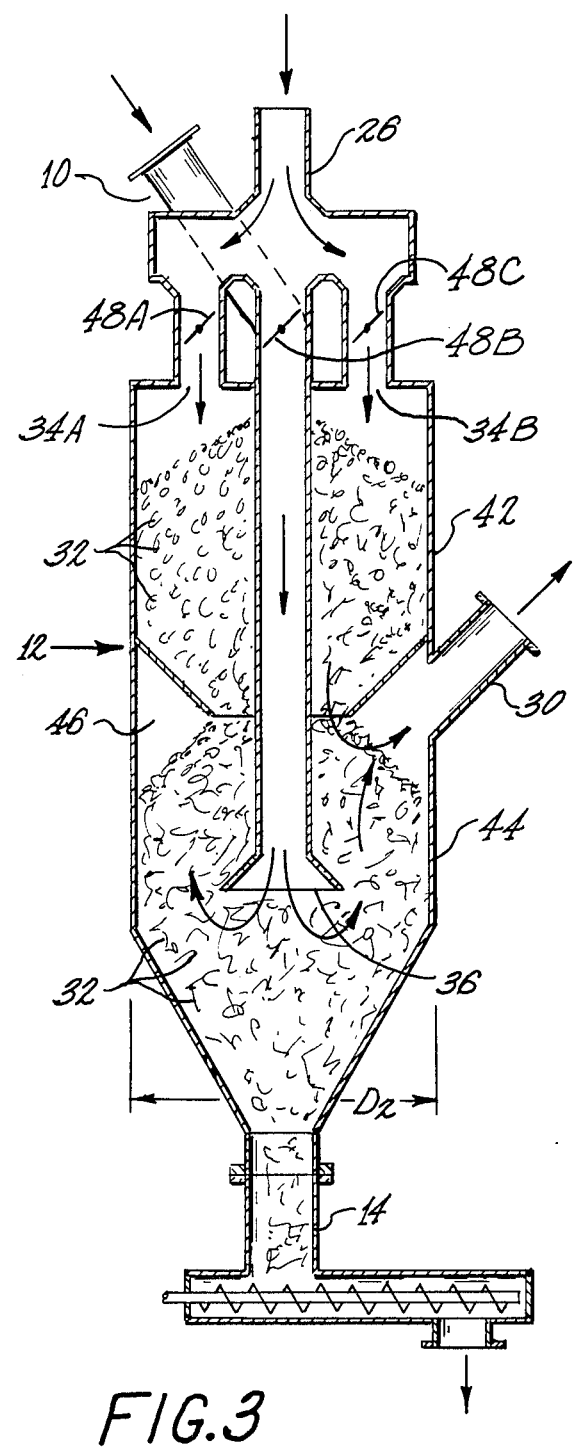
FIG. 3 is a schematic view in elevation of a media heater according to the principles of the invention.

As shown in FIG. 3, the hopper of the invention uses hot gas inlet 26 having two discharge ends, 34A and 34B positioned near the first or top end of the hopper, and bottom hot gas inlet 36 positioned near the second or bottom end of the hopper.

Hot gas outlet 30 is positioned at approximately the middle of the hopper. The hot gas outlet is connected to a fan and pollution control apparatus similar to fan 38 and pollution control apparatus 40, shown schematically in FIG. 1. This equipment pulls gases from the hopper and treats them for pollution control purposes in the manner well-known in the art. Thus, a flow of hot gases is established both downwardly from the top of the hopper toward the center of the hopper, and upwardly from the bottom of the hopper to the center of the hopper. Preferably, the hopper is comprised of an upper hopper portion, such as hopper top cone 42 and a lower hopper portion, such as hopper bottom cone 44, defining at their intersection air space 46 which is connected to the hot gas outlet.

It can be seen that the portion of the greatest negative pressure in the apparatus of the invention is in the air space, positioned at the approximate mid height of the hopper. A typical negative pressure reading at the hot gas outlet is about 10 inches water column. Since the hot gas outlet is not positioned adjacent the media inlet or media outlet, only a small amount of gases will be drawn from the media inlet or outlet through the hot gas outlet. A typical negative pressure reading at the media outlet or inlet is about one inch water column.

Since the flow of hot gases is divided into two principal flows, i.e., a downward flow from the top and an upward flow from the bottom, the same pressure differential can be employed while the hopper diameter, $D_2$, is reduced. For example, $D_2$ may be as small as 50–70 percent of $D_1$ of the prior art hopper. The smaller sized hopper is economically advantageous because less of the expensive media are employed.

It can also be seen that the flow of hot gases, which may have temperatures of approximately 1300° F., impinge on the cold media, which may have a temperature of approximately 500° F., in the top portion of the hopper. Condensation of some of the gases occurs because of the temperature differential between the gases and the media, and this tends to adhere the batch dust to the media, thereby causing the batch material on the media to flow through the hopper adhered to the media. This prevents the batch dust from becoming airborne.

As shown, a further aspect of the invention comprises dampers 48A, 48B and 48C to control the relative flows of hot gases into the top and bottom portions of the hopper.

It will be evident from the foregoing that various modifications can be made to this invention. Such, however, are considered as being within the scope of this invention.

I claim:

1. Apparatus for heating heat transfer media comprising a chamber having a media inlet at a first end and a media outlet at the second end, a first inlet for hot gases Positioned near the first end of said chamber, a second inlet for hot gases positioned near the second end of said chamber, a hot gas outlet positioned near the middle of said chamber, and means for pulling gases from said chamber at said hot gas outlet, said means for pulling being of sufficient strength to establish two principal hot gas flows, one flow being from said hot gas inlet at said first end to said hot gas outlet, and the other flow being from said hot gas inlet at said second end to said hot gas outlet.

2. The apparatus of claim 1 comprising means for controlling the relative proportions of hot gases flowing through said first and second inlets, respectively.

3. Apparatus for heating heat transfer media comprising a chamber having a media inlet at the top end and a media outlet at the bottom end, a top inlet for hot gases positioned near the top end of said chamber, a bottom inlet for hot gases positioned near the bottom end of said chamber, a hot gas outlet positioned near the mid height of said chamber, and means for pulling gases from said chamber at said hot gas outlet, said means for pulling being of sufficient strength to establish two principal hot gas flows, one flow being downward from the top hot gas inlet toward said hot gas outlet, and the other flow being upward from the bottom hot gas inlet toward said hot gas outlet.

4. The apparatus of claim 3 in which said chamber comprises an upper hopper and a lower hopper.

5. The apparatus of claim 4 in which said hot gas outlet is positioned at the intersection of said upper hopper and said lower hopper.

6. The apparatus of claim 3 comprising means for controlling the relative proportions of hot gases flowing through said top and bottom inlets, respectively.

7. The method of heating heat transfer media comprising passing the media from a first end to a second end through a chamber, introducing hot gases near the first end of said chamber, introducing hot gases near the second end of said chamber, and exhausting hot gases from a hot gas outlet Positioned near the middle of said chamber, the exhausting step being of sufficient strength to create two principal hot gas flows, one flow being from said first end toward said hot gas outlet, and the other flow being from said second end toward said hot gas outlet.

8. The method of claim 7 comprising controlling the relative proportions of hot gases introduced near the first and second ends, respectively, of said chambers.

9. The method of heating heat transfer media comprising passing the media downwardly through a chamber, introducing hot gases near the top of said chamber, introducing hot gases near the bottom of said chamber, and exhausting hot gases from a hot gas outlet positioned near the middle of said chamber, the exhausting step being of sufficient strength to create two principal hot gas flows, one flow being downward from said top toward said hot gas outlet, the other flow being upward from said bottom toward said hot gas outlet.

10. The method of claim 9 in which the media are coated with fine particulate matter and the introduction of hot gases near the top of said chamber causes condensation on the media, thereby adhering the particulate material to the media.

11. The method of claim 9 comprising controlling the relative proportions of hot gases introduced near the top and bottom, respectively of said chamber.

12. The method of claim 9 in which the exhausting step establishes a negative pressure of about 10 inches water column at said hot gas outlet.

* * * * *